(12) United States Patent
Shachaf et al.

(10) Patent No.: US 11,507,728 B2
(45) Date of Patent: Nov. 22, 2022

(54) CLICK TO DOCUMENT

(71) Applicant: NICE LTD., Ra'anana (IL)

(72) Inventors: Yuval Shachaf, Even Yehuda (IL); Yaron Bialy, Madrid (ES); Natan Katz, Tel Aviv (IL); Eran Roseberg, Hogla (IL)

(73) Assignee: NICE LTD., Ra'anana (IL)

( * ) Notice: Subject to any disclaimer, the term of this patent is extended or adjusted under 35 U.S.C. 154(b) by 0 days.

(21) Appl. No.: 17/160,392

(22) Filed: Jan. 28, 2021

(65) Prior Publication Data
US 2022/0237364 A1 Jul. 28, 2022

(51) Int. Cl.
*G06F 17/00* (2019.01)
*G06F 40/117* (2020.01)
*G06F 16/35* (2019.01)
*G06F 40/177* (2020.01)

(52) U.S. Cl.
CPC ............ *G06F 40/117* (2020.01); *G06F 16/35* (2019.01); *G06F 40/177* (2020.01)

(58) Field of Classification Search
None
See application file for complete search history.

(56) References Cited

U.S. PATENT DOCUMENTS

| | | | |
|---|---|---|---|
| 2013/0304861 A1* | 11/2013 | Gupta | H04N 1/00949 709/217 |
| 2015/0154526 A1* | 6/2015 | Yates | G06Q 10/06393 705/7.39 |
| 2016/0358101 A1* | 12/2016 | Bowers | G06F 9/453 |
| 2018/0074931 A1* | 3/2018 | Garcia | G06F 11/3476 |
| 2019/0180218 A1* | 6/2019 | Vigneswaran | G06Q 10/06316 |
| 2022/0083353 A1* | 3/2022 | Mastracci | G06F 9/451 |

* cited by examiner

*Primary Examiner* — Mustafa A Amin
(74) *Attorney, Agent, or Firm* — Soroker Agmon Nordman

(57) ABSTRACT

A computerized-method for automatically documenting automatically-discovered actions of a business-process for automation thereof is provided herein. The computerized-method includes operating a build-automation-document module. The build-automation-document module includes: (i) retrieving the set of automatically-discovered actions of the business process for automation thereof. Each action is of a related type and related to an application to complete the business process via the applications portal. (ii) for each action of the set of automatically-discovered actions, extracting an associated routine-name of a routine; (iii) grouping similar actions by related window in related application and type of action into clusters of actions; (iv) removing clusters of actions which are not necessary to an automated business process; (v) sorting the clusters of actions in an order for automatically performing the business process; and (vi) saving the sorted automatically-discovered actions into a file to be presented on a display unit that is associated to the computerized system.

9 Claims, 8 Drawing Sheets

| id | Unique identifier of the instance | | |
|---|---|---|---|
| routineName | Name of the routine comprising all instances. This is used as the title for the automation document | | |
| listOfActions | List of all the actions in the instance | | |
| startTime | timestamp of the action | | |
| action | Type of action such as copy, paste, mark | | |
| actionComponent | The given name of the entity the action is taken on | | |
| window | Name of the of the window of the application | | |
| text | The copied or pasted text (if exists) | | |
| App | Name of the application such as explorer | | |
| User | The name of the user that has done the actions | | |
| dragFrom/ dragTo | In case of action of drag and drop | | |
| controlType | The type of the entity the action is taken on, such as input text box | | |
| "shift": "ctrl": true, "alt": false, "cmd": "C" | Various keyboard controls | | |
| screenshot | Screen shot Action Time | Screenshot taken timestamp | |
| | uuid | Unique screenshot indetifier | |
| | screenshot | Base64 screenshot encoding | |
| | actionLocation | XY coordinates of the action with respect to display | |

210B { "id": "d13d1f5a-58b4-4f5b-8304-b1fe4d5c820d",
"routineName": "Salesforce address to CRM",
220B "listOfActions":
[
{ ...... },
{
230B "id": "800000",
240B "startTime": 1591709861200,
"action": "Ctrl + C",
"actionComponent": "con19street",
"window": "Contact Edit ~ Salesforce - Professional Edition",
"app": "iexplore",
"text": "* S. Leatherwood St",
"user": "User3",
"processTitle": "Contact Edit ~ Salesforce - Professional Edition",
"dragFrom": "",
"dragTo": "",
"actionDescriptorId": "7695",
"controlType": "TEXTAREA",
"identifier": "con19street",
"shift": false,
"ctrl": true,
"alt": false,
250B "cmd": "C",
"screenshot": {
"screenshotActionTime": 1591609863150,
"uuid": "3E79A67E-C427-428F-94EC-872139E02046",
"screenshot": "/9j",
"actionLocation": {
"left": 288,
"top": 436,
"height": 27,
"width": 136
}
}
},
{......} ]

Figure 2B

CLICK TO DOCUMENT

TECHNICAL FIELD

The present disclosure generally relates to Robotic Process Automation (RPA) solutions, and more specifically to automatic documentation of automatically identified most significant business flows for automation.

BACKGROUND

One of the main building-blocks of system automation is identifying business processes within an enterprise which may be significant candidates for automation, namely, they are feasible for automation and have high potential Return On Investment (ROI) by saving significant manual efforts and workloads when being handled by robots instead of human users.

Along with the automation of business processes, enterprises commonly keep a documentation of the automation of the business processes for various reasons, such as characterizing of business processes of the system for future modifications and the like.

Some existing solutions are documenting recorded actions by which on-demand recording a process and during the recording there is an option for the user to add annotations for the different steps and based on that a documentation of the recorded actions is generated. These solutions may be time and money consuming and depend on manual performance of the user.

A summary of recorded actions of a business process which may be manually created by a user, may not be meaningful or have added value for the enterprise. Therefore, there is a need for a technical solution that will automatically create documentation of business processes automations, thus, saving time and money for customers and integrators who deploy an RPA solution. Furthermore, the needed technical solution should automatically generate a meaningful documentation such as a representation that is including a summary and a diagram of the way that the automation will automate the business process, which is advantageous over the way that the user may be executing it manually.

SUMMARY

There is thus provided, in accordance with some embodiments of the present disclosure, a computerized-method for automatically documenting automatically-discovered actions of a business-process for automation thereof.

In accordance with some embodiments of the present disclosure, in a computerized system may comprise an applications portal to complete a business process, a database, a memory to store the database, and a server that is running an automation finder module, the automation finder module may be communicating over a communication network with the applications portal to discover and store a set of automatically-discovered actions of a business process for automation in the database, the computerized-method may operate a build-automation-document module.

Furthermore, in accordance with some embodiments of the present disclosure, the build-automation-document module may comprise retrieving the set of automatically-discovered actions of the business process for automation thereof.

Furthermore, in accordance with some embodiments of the present disclosure, each action may be of a related type and related to an application to complete the business process via the applications portal.

Furthermore, in accordance with some embodiments of the present disclosure, for each action of the set of automatically-discovered actions, the build-automation-document module may be extracting an associated routine-name of a routine and then grouping similar actions by a related window in a related application and type of action into clusters of actions.

Furthermore, in accordance with some embodiments of the present disclosure, the build-automation-document module may be sorting the clusters of actions in an order for automatically performing the business process, and then, the automation-document module may be saving the sorted automatically-discovered actions into a file i.e., a document to be presented, on a display unit, that may be associated to the computerized system.

Furthermore, in accordance with some embodiments of the present disclosure, the sorting of the clusters of actions may be performed according to a minimum timestamp of action in each cluster of actions.

Furthermore, in accordance with some embodiments of the present disclosure, the documentation may comprise a title of the business process, a summary of the business process and details of ordered clusters of actions. Each cluster of actions may include one or more actions.

Furthermore, in accordance with some embodiments of the present disclosure, each action or cluster of actions in the automated business process may be associated with a screenshot. The screenshot of a cluster of actions may be a merged screenshot of all screenshots of each action.

Furthermore, in accordance with some embodiments of the present disclosure, the file may be of a format that may be selected from: Microsoft Word or Hypertext Markup Language (HTML) or Portable Document Format (PDF) or any other readable file format.

Furthermore, in accordance with some embodiments of the present disclosure, the ordered clusters of actions may be presented as a flow diagram.

Furthermore, in accordance with some embodiments of the present disclosure, each action in the set of automatically discovered actions of a business process for automation may be a keyboard-based command or a mouse-click command in one or more applications to complete the business process, via the applications portal.

Furthermore, in accordance with some embodiments of the present disclosure, the routine of the extracted associated routine-name may be comprised of one or more actions.

Furthermore, in accordance with some embodiments of the present disclosure, the routine may be a routine for data exchange within one application or between two or more applications, which are operated via the applications portal to complete the business process.

Furthermore, in accordance with some embodiments of the present disclosure, the removing clusters of actions may be performed according to a preconfigured action type blacklist.

Furthermore, in accordance with some embodiments of the present disclosure, the preconfigured action type blacklist may include at least one action of: (i) selecting an object or a text and moving it and then placing it into alternate area; (ii) switching between tabs or windows; (iii) opening a menu of ancillary operations; (iv) any other action.

BRIEF DESCRIPTION OF THE DRAWINGS

In order for the present invention, to be better understood and for its practical applications to be appreciated, the FIG. 1 schematically illustrates a high-level diagram of a computerized-system 100 for automatically documenting selected business-processes for automation thereof, in accordance with some embodiments of the present invention;

FIG. 2A shows an example of a table of fields of metadata required for the automation document, in accordance with some embodiments of the present invention;

FIG. 2B shows an example of a record of actual data of the table of fields of metadata required for the automation document, in accordance with some embodiments of the present invention;

DETAILED DESCRIPTION

Figure 1:
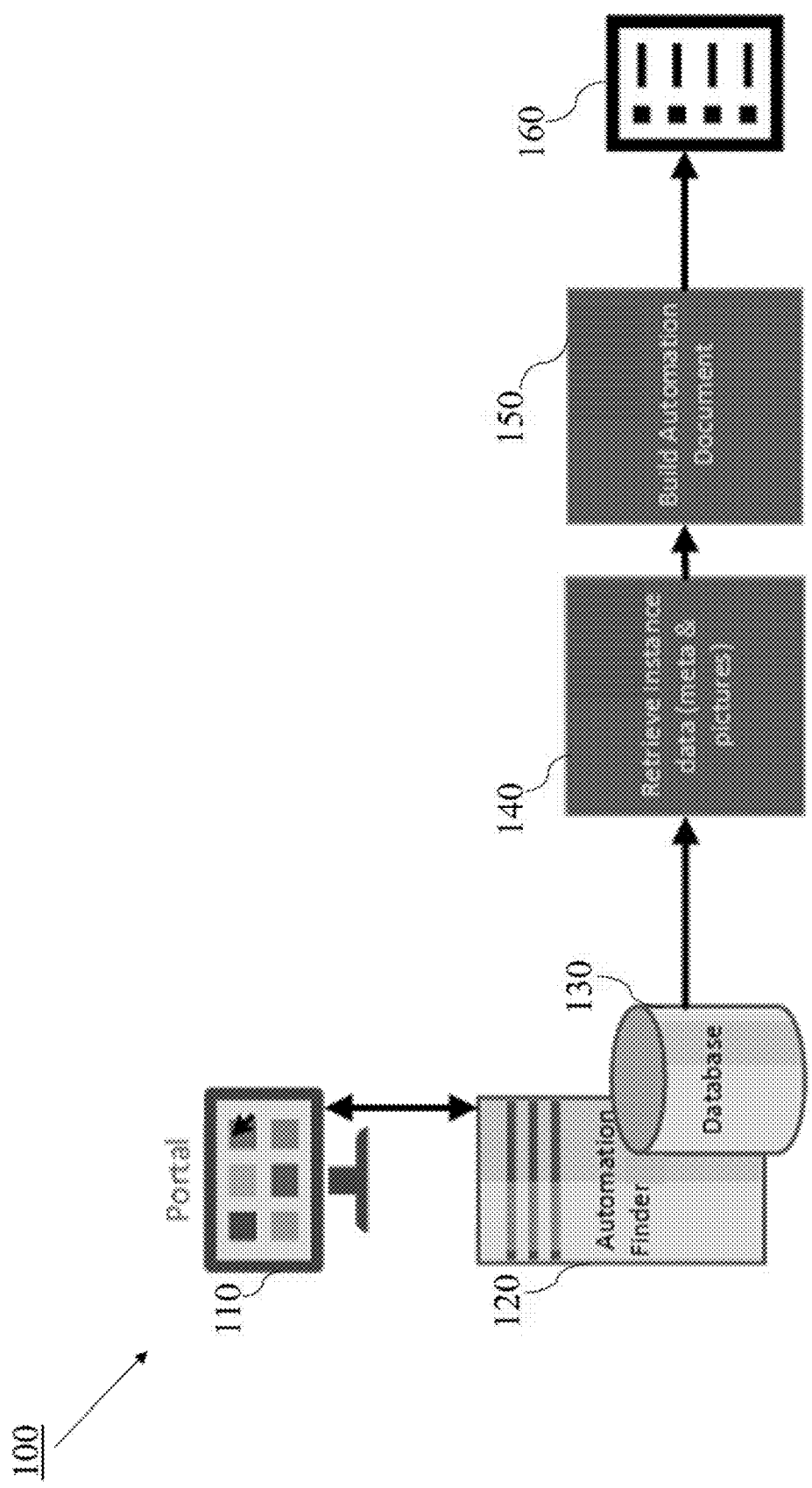

In the following detailed description, numerous specific details are set forth in order to provide a thorough understanding of the disclosure. However, it will be understood by those of ordinary skill in the art that the disclosure may be practiced without these specific details. In other instances, well-known methods, procedures, components, modules, units and/or circuits have not been described in detail so as not to obscure the disclosure.

Although embodiments of the disclosure are not limited in this regard, discussions utilizing terms such as, for example, "processing," "computing," "calculating," "determining," "establishing", "analyzing", "checking", or the like, may refer to operation(s) and/or process(es) of a computer, a computing platform, a computing system, or other electronic computing device, that manipulates and/or transforms data represented as physical (e.g., electronic) quantities within the computer's registers and/or memories into other data similarly represented as physical quantities within the computer's registers and/or memories or other information non-transitory storage medium (e.g., a memory) that may store instructions to perform operations and/or processes.

Although embodiments of the disclosure are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. Unless explicitly stated, the method embodiments described herein are not constrained to a particular order or sequence. Additionally, some of the described method embodiments or elements thereof can occur or be performed simultaneously, at the same point in time, or concurrently. Unless otherwise indicated, use of the conjunction "or" as used herein is to be understood as inclusive (any or all of the stated options).

The term "JavaScript Object Notation (JSON)" used herein, refers to a data-interchange format. It is often used when data is sent from a server to a web page.

The term "desktop actions" as used herein, refers to actions which are operated by a user via user desktop in a window of an application.

Business process management may entail a continuous recording of a workflow of routines and actions to complete a business process. Business process management is a way to control business processes in an enterprise and it may be used in times when the enterprise wishes to be more efficient and effective by optimizing actions of its business processes. Business process documentation may be a critical part of the business process management. It may become an operational blueprint which may provide users, such as business analysts, a support when making changes to the business processes.

An automation discovery service may discover which business processes in an enterprise would benefit from automation and for which services automated actions should be developed. Automated discovery solutions pull data from all of applications which are involved in executing a business process from beginning to end. By the usage of a discovery algorithm, it then determines process definitions and models.

Robotic Process Automation (RPA), handles repetitive actions of business processes of one application or across applications, by using software robots to perform these actions. When an enterprise is deploying an RPA solution to improve its business processes, it means that some existing business processes may change. Accordingly, there is a need for a technical solution for automatically documenting the selected business-processes for automation thereof.

FIG. 1 schematically illustrates a high-level diagram of a computerized-system 100 for automatically documenting selected business-processes for automation thereof, in accordance with some embodiments of the present invention.

Figure 3A:
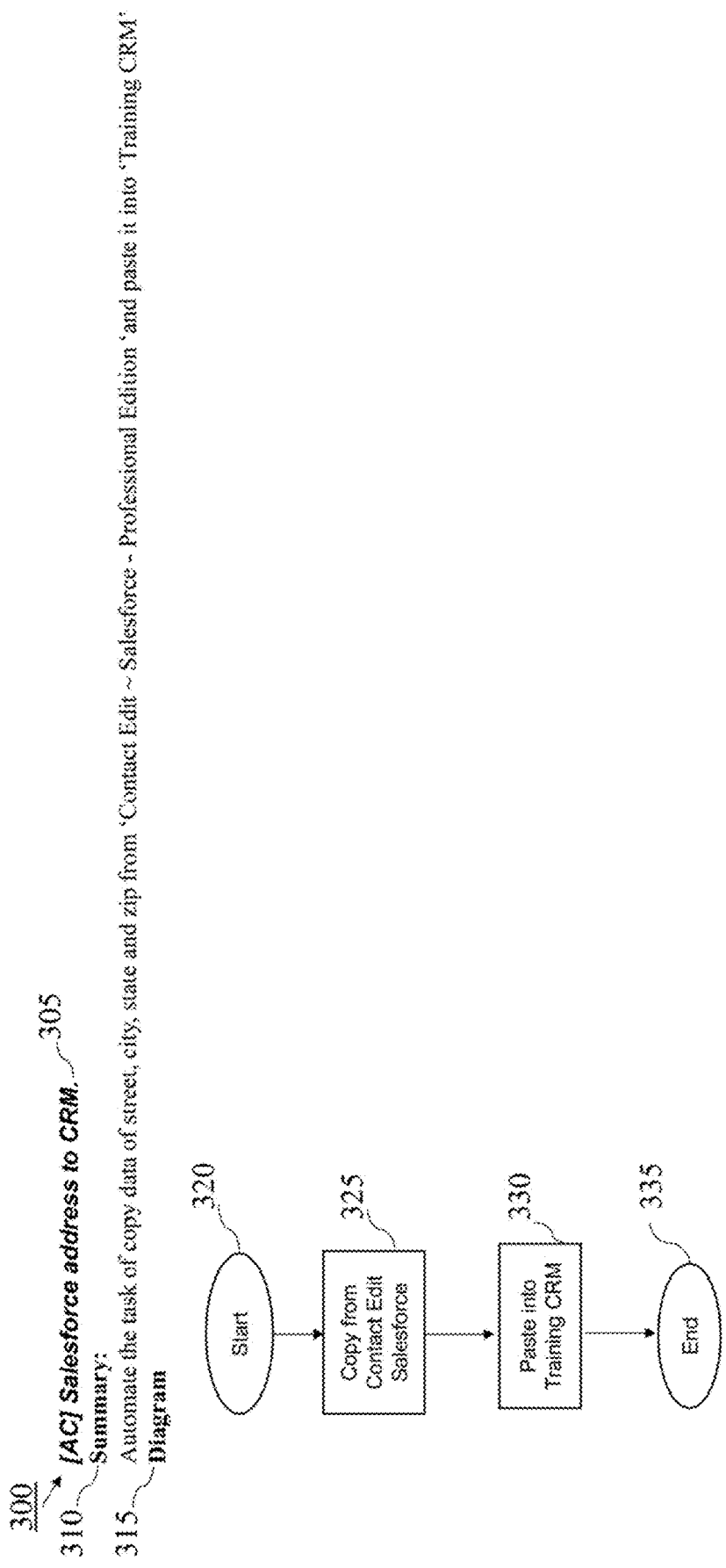
FIGS. 3A-3B illustrate an example of a document of automatic documenting of automatically-discovered actions of a business-process for automation thereof, in accordance with some embodiments of the present invention.
Figure 3B:
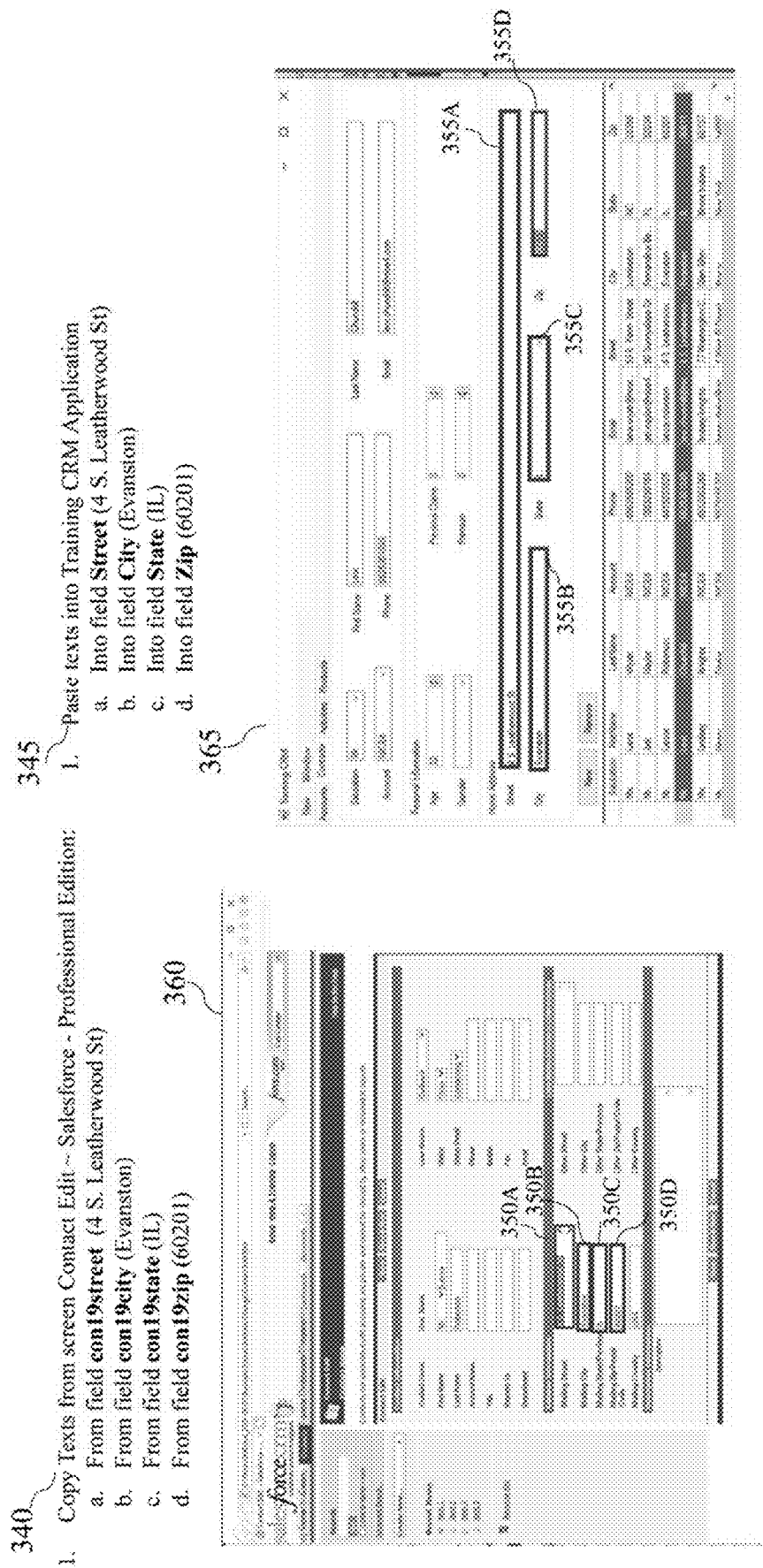

According to some embodiments of the present disclosure, system 100 may automatically create a structured document, such as document 160 and document 300 in FIGS. 3A-3B, using unsupervised techniques. Every business process may have a detailed document that may describe it so it may be applied into the enterprise.

Figure 5A:
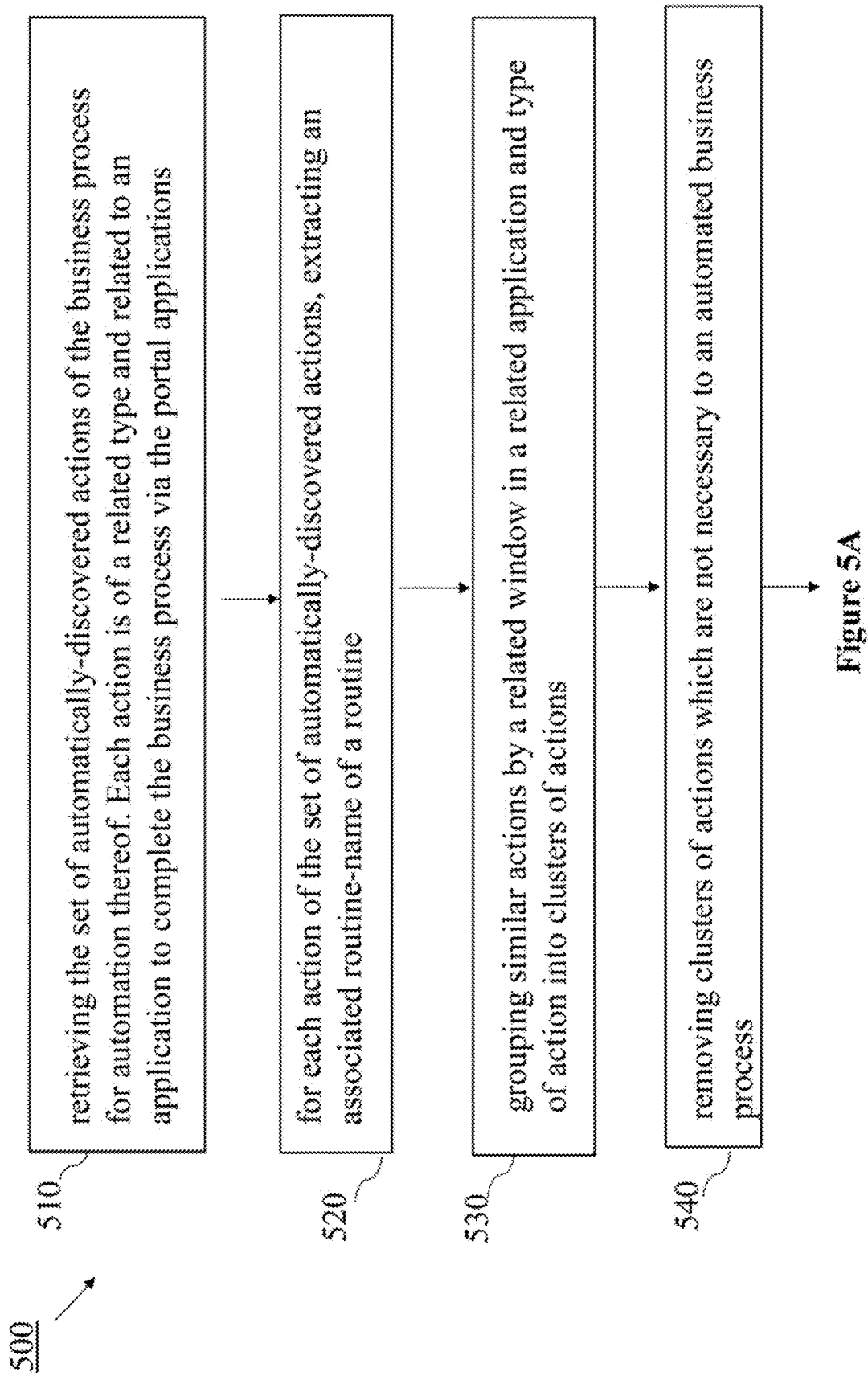
FIGS. 5A-5B are a flow diagram of a build-automation-document module, in accordance with some embodiments of the present invention.
Figure 5B:
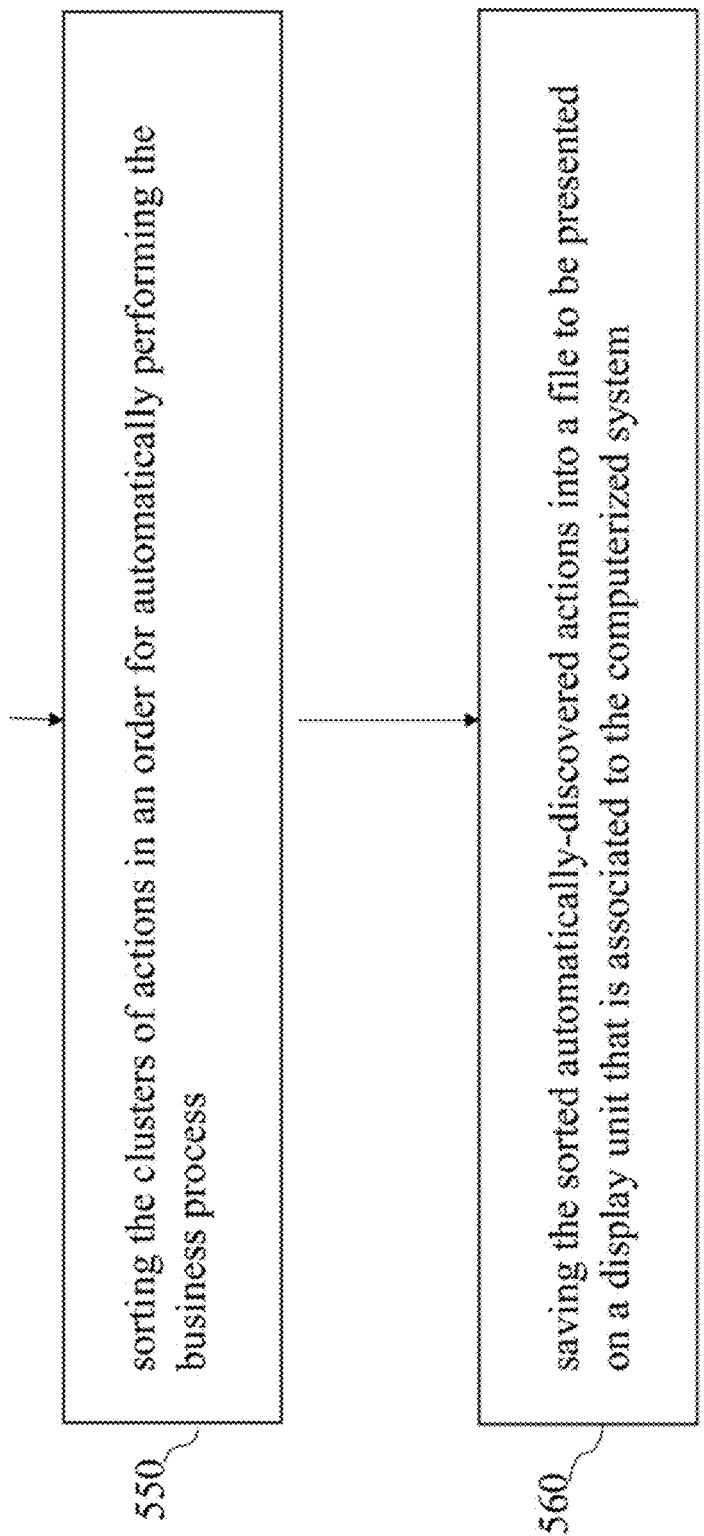

According to some embodiments of the present disclosure, build automation document module, such as build automation document module 150, and such as build-automation-document 500 in FIGS. 5A-5B may use the results of an automation discovery service of a discovery system, such as Automation Finder Server 120, for example, as described in U.S. application Ser. No. 16/243,743 and in U.S. application Ser. No. 16/440,287.

According to some embodiments of the present disclosure, the results of an automation discovery service of a discovery system, such as Automation Finder Server 120, may be actions of a business process which were confirmed by a user as profitable or as having high potential Return On Investment (ROI), for automation. For example, the results may be a list of actions, such as the list of actions 200B in FIG. 2B.

According to some embodiments of the present disclosure, all the results of the automation discovery service may be stored in a database, such as database 130. The results may comprise routines, e.g., routines which are comprised of one or more actions and their instances. The routines may represent repetitive desktop actions, which were performed by users to complete a business process by one or more applications via an applications portal (not shown).

According to some embodiments of the present disclosure, a business process for automation may be comprised of one or more routines and each routine may be comprised of many instances. Each instance may be a series of a tasks, e.g., a business process, that is performed by a user at a specific time. Moreover, the routine may be a routine for data exchange within one application or between two or more applications, which are operated via an applications portal (not shown) to complete the business process by a user, such as an agent in a contact center.

For example, a business process for automation, where there is a data exchange within one application there may be a process that performs a change of data plan for a customer. In that case, data may be processed across few screens of the same application.

According to some embodiments of the present disclosure, a business analyst, who may use a portal, such as portal 110, may scan the various routines, which were found by a discovery system, such as, Automation Finder Server 120 and may click on the routine that is of interest, once within all its instances which are presented. The portal 110 may a portal that may be connected to the Automation Finder Server 120 over a communication network.

According to some embodiments of the present disclosure, once the business analysist is satisfied with the instance, the business analyst may click on a button may be called "click to document" in the portal, such as portal 110.

According to some embodiments of the present disclosure, the click on a button, such as "click to document" button, may invoke the actual process that builds the automation document by a build automation document module, such as build automation document module 150, and such as build-automation-document 500 in FIGS. 5A-5B. The document, such as document 160, and document 300 in FIGS. 3A-3B, may comprise a title, a summary, detailed instructions followed by screenshots and a flow diagram. The document 160 may be saved into a file that may be any readable file, such as Word, HTML, PDF, and the like.

According to some embodiments of the present disclosure, once the business analyst clicks on an instance, a server, such as server 140 may retrieve all the metadata and pictures which are associated with these instances, and the data may be transferred to the click to document to build automation document module, such as build automation document module 150, and such as build-automation-document module 500 in FIGS. 5A-5B, by any means of data representation, such as JavaScript Object Notation (JSON).

According to some embodiments of the present disclosure, the metadata required for the automation document is shown in detail in FIGS. 2A-2B. Pictures, such as screenshots 360 and 365 in FIG. 3B are actual snapshots of user screen at the exact point of the desktop action has been taken by a user. These pictures e.g., screenshots, are required for the automation of the document, e.g., file.

FIG. 2A shows an example of a table 200A of fields of metadata required for the automation document, in accordance with some embodiments of the present invention.

According to some embodiments of the present disclosure, table 200A describes each key in the metadata required for the automation document, called instance data.

According to some embodiments of the present disclosure, the key 'routine name' 210A may be the name of the routine comprising all the instances. The routine name may be used as a title for the automation document 160. For example, the routine name may be "Salesforce address to CRM" 210B in FIG. 2B.

According to some embodiments of the present disclosure, the key 'list of actions' 220A may be a list of all the actions in the instance. For example, list of actions 220B in FIG. 2B. The key 'start time' 230A may be the timestamp of the action. For example, stat time 230B in FIG. 2B.

According to some embodiments of the present disclosure, the key 'action' 240A may be the type of action, such as copy, paste, mark and for example, 'Ctrl+C' 240B in FIG. 2B.

According to some embodiments of the present disclosure, the key 'screenshot' 250A may be details of a screenshot that has been taken. For example, screenshot details 250B, in FIG. 2B and an actual image encoded, e.g., in base64.

According to some embodiments of the present disclosure, during the operation of build-automation-document module, such as build-automation-document module 150 in FIG. 1 and such as build-automation-document module 500 in FIGS. 5A-5B, each action may have its associate screenshot 250A.

According to some embodiments of the present disclosure, the screenshots in the document, such as document 160, may be consolidated screenshots of a plurality of actions, i.e., related screenshots of each action in the plurality of actions, where the corresponding fields may be highlighted.

For example if there were actions, such as 'list of actions' 220A on keys in same application or app and there is a screenshot for each action along with the highlighted field, then when the document may be created, the plurality of screenshots of the actions, such as 'list of actions' 220A, may be merged into one screenshot having all the corresponding fields highlighted, in a document that may comprise a tide, a summary, detailed instructions followed by screenshots and a flow diagram, such as document 160 in FIG. 1.

FIGS. 3A-3B illustrate an example of a document 300 of automatic documenting of automatically-discovered actions of a business-process for automation thereof, in accordance with some embodiments of the present invention.

According to some embodiments of the present disclosure, document 300 may be an example of a document, such as document 160 in FIG. 1. The document, such as document 160 in FIG. 1 and such as document 300, may be generated automatically by a module, such as build-automation-document module 500 in FIG. 5 and such as computerized-method 400 for automatically documenting automatically-discovered actions of a business-process for automation thereof, in FIG. 4.

For example, a routine having a routine name, such as "Salesforce address to CRM", 210B in FIG. 2B, may comprise a data exchange between two applications, such as Salesforce and Customer Relationship management (CRM). The routine may include performing copy of text from keys which are related to a contact, such as street, city, state and zip code by actions, e.g. desktop actions, such as 'Ctrl+C', via a window of an application, such as Salesforce, e.g., the window of Salesforce 360 in FIG. 3B.

According to some embodiments of the present disclosure, the routine having a routine name, such as "Salesforce address to CRM", 210B in FIG. 2B, may further include performing paste of the copied text by actions, e.g. desktop actions, such as 'Ctrl+V', to a window of an application, such as CRM, e.g. window of training CRM 365 in FIG. 3B.

According to some embodiments of the present disclosure, the document, such as document 300, may have a title. For example, the title may be the routine name 305 in FIG. 3A. Furthermore, the document may have a summary section such as summary 310 in FIG. 3A, which may describe the routine. For example, for a routine, having a routine name "Salesforce address to CRM" 305 in FIG. 3A, the summary 310 in FIG. 3A, may include "Automate the task of copy data of street, city, state and zip from 'Contact Edit~Salesforce-Professional Edition' and paste it into 'Training CRM'".

According to some embodiments of the present disclosure, the document, such as document 300 and such as document 160 in FIG. 1, may include a diagram, such as diagram 315 in FIG. 3A. The diagram may include a flowchart which may begin with a shape to indicate the beginning of the routine, e.g., start shape 320 and then a series of actions. For example, aggregated actions, such as 'copy from contact edit Salesforce' 325 and aggregated actions, such as 'paste training CRM' 330. Then after the last action, in the series of actions, there may be a shape to indicate the ending point, such as end shape 335.

According to some embodiments of the present disclosure, the document, such as document 300 may also include detailed instructions followed by screenshots, such as detailed instructions 340 e.g., 'Copy Texts from screen Contact Edit~Salesforce-Professional Edition: a. From field con19street (4 S. Leatherwood St) b. From field con19city (Evanston) c. From field con19state (IL) d. From field con19zip (60201)', followed by screenshot 360 of a window of the application, and detailed instructions 345, e.g., 'Paste texts into Training CRM Application a. Into field Street (4 S. Leatherwood St) b. Into field City (Evanston) c. Into field State (IL) d. Into field Zip (60201)', followed by screenshot 365 of a window of the application.

According to some embodiments of the present disclosure, the screenshot such as screenshot 360 may be a merged screenshot of screenshots of the actions which were performed in the Salesforce application, e.g. detailed instructions 340 may be highlighted fields 350A-350D. The screenshot, such as screenshot 365, may be a merged screenshot of the actions, which were performed in the CRM application, e.g. detailed instructions 345 may be highlighted fields 355A-355D.

Figure 4:
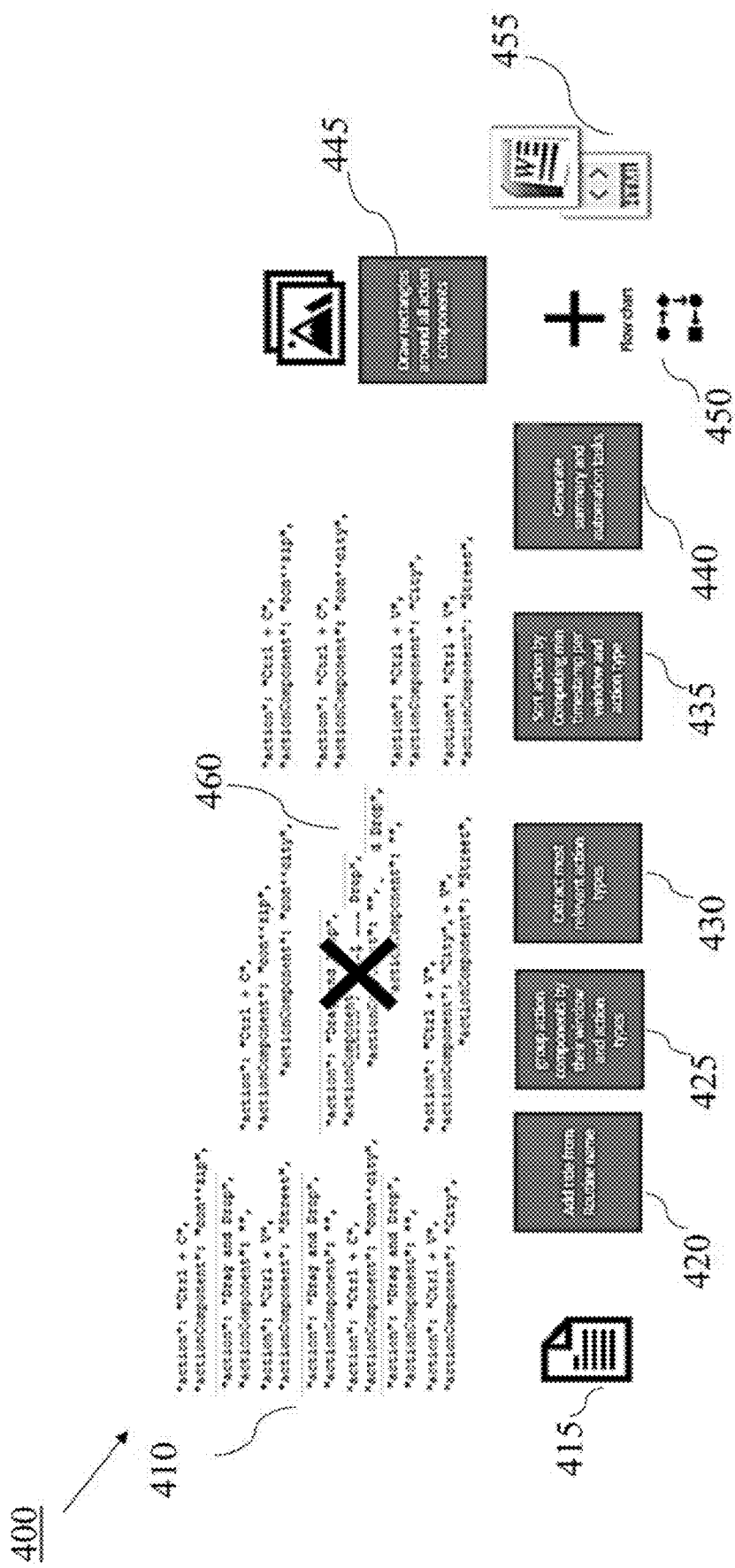
FIG. 4 is a flow diagram of a computerized-method for automatically documenting automatically-discovered actions of a business-process for automation thereof, in accordance with some embodiments of the present invention.

FIG. 4 is a flow diagram of a computerized-method 400 for automatically documenting automatically-discovered actions of a business-process for automation thereof, in accordance with some embodiments of the present invention.

According to some embodiments of the present disclosure, results of an automation discovery service of a discovery system, such as Automation Finder Server 120 in FIG. 1, may be actions of a business process which were confirmed by a user as profitable or as having high potential Return On Investment (ROI), for automation. For each action in the results there may be an action component associated to it. Such list of results, e.g. list of results 410, having actions and related components may be related to one or more routines which are performed to accomplish the business process.

According to some embodiments of the present disclosure, for each action of the actions in the result, the computerized-method 400 or a module, such as build-automation-document module 500 in FIG. 5, may extract an associated routine-name of each routine.

According to some embodiments of the present disclosure, in a computerized system the computerized-method 400 or a module, such as build-automation-document module 500 in FIG. 5, may group similar actions by a related window in a related application and type of action 425 into clusters of actions.

According to some embodiments of the present disclosure, the computerized-method 400 or a module, such as build-automation-document module 500 in FIG. 5 may remove clusters of actions which are not necessary to the automated business process. Thus, it may extract the most relevant action types 430.

According to some embodiments of the present disclosure, the removed clusters, such as removed clusters 460, may be of action types, which are in a preconfigured action type blacklist. For example, "drag and drop", "right click", "Alt+Tab" and the like.

According to some embodiments of the present disclosure, sort action by computing min timestamp per window and action type 435, i.e., sort clusters of actions by a minimum timestamp per window of an application and action type may comprise sorting the clusters of actions in an order for automatically performing the business process according to a minimum timestamp of action in each cluster of actions. Meaning, each cluster of actions may have a related timestamp for each action. The clusters may be ordered by the minimum timestamp in each cluster of actions.

According to some embodiments of the present disclosure, generate summary and automation tasks 440 and then draw rectangles around all action components 445 in the merged screenshots, thus marking the fields in the window application that is related to the actions.

According to some embodiments of the present disclosure, generating a flowchart 450 such as flow diagram 315 in FIG. 3A and then saving the title, the summary, the merged screenshots and the sorted automatically-discovered actions into a file 455, e.g., a document, to be presented on a display unit that is associated to the computerized system.

FIGS. 5A-5B are a flow diagram of a build-automation-document module 500, in accordance with some embodiments of the present invention.

According to some embodiments of the present disclosure, operation 510 may comprise retrieving the set of automatically-discovered actions of the business process for automation thereof. Each action is of a related type and related to an application to complete the business process, via the applications portal.

According to some embodiments of the present disclosure, operation 520 may comprise for each action of the set of automatically-discovered actions, extracting an associated routine-name of a routine. The routine name, such as routine name 210A may be "Salesforce address to CRM" 210B in FIG. 2B.

According to some embodiments of the present disclosure, operation 530 may comprise grouping similar actions by a related window in an application and type of action into clusters of actions.

According to some embodiments of the present disclosure, operation 540 may comprise removing clusters of actions which are not necessary to an automated business process. The removing of clusters of actions may be performed according to a preconfigured action type blacklist. The preconfigured action type blacklist may include at least one action of: (i) selecting an object or a text and moving it and then placing it into alternate area; (ii) switching between tabs or windows; (iii) opening a menu of ancillary operations; (iv) any other action. For example, "drag and drop", "right click", "Alt+Tab" and the like.

According to some embodiments of the present disclosure, operation 550 may comprise sorting the clusters of actions in an order for automatically performing the business process. For example, a cluster of copy actions may precede a cluster of corresponding paste actions. The order may be determined by the minimum timestamp of all actions within each cluster.

According to some embodiments of the present disclosure, operation 560 may comprise saving the sorted automatically-discovered actions into a file to be presented on a display unit that is associated to the computerized system.

It should be understood with respect to any flowchart referenced herein that the division of the illustrated method into discrete operations represented by blocks of the flowchart has been selected for convenience and clarity only. Alternative division of the illustrated method into discrete operations is possible with equivalent results. Such alternative division of the illustrated method into discrete operations should be understood as representing other embodiments of the illustrated method.

Similarly, it should be understood that, unless indicated otherwise, the illustrated order of execution of the operations represented by blocks of any flowchart referenced herein has been selected for convenience and clarity only. Operations of the illustrated method may be executed in an alternative order, or concurrently, with equivalent results. Such reordering of operations of the illustrated method should be understood as representing other embodiments of the illustrated method.

Different embodiments are disclosed herein. Features of certain embodiments may be combined with features of other embodiments; thus, certain embodiments may be combinations of features of multiple embodiments. The foregoing description of the embodiments of the disclosure has been presented for the purposes of illustration and description. It is not intended to be exhaustive or to limit the disclosure to the precise form disclosed. It should be appreciated by persons skilled in the art that many modifications, variations, substitutions, changes, and equivalents are possible in light of the above teaching. It is, therefore, to be understood that the appended claims are intended to cover all such modifications and changes as fall within the true spirit of the disclosure. While certain features of the disclosure have been illustrated and described herein, many modifications, substitutions, changes, and equivalents will now occur to those of ordinary skill in the art. It is, therefore, to be understood that the appended claims are intended to cover all such modifications and changes as fall within the true spirit of the disclosure.

The invention claimed is:

1. A computerized-method for automatically documenting automatically-discovered actions of a business-process for automation thereof, the computerized-method comprising:

in a computerized system, comprising an applications portal to complete a business process, a database, a memory to store the database, and a server that is running an automation finder module, said automation finder module is communicating over a communication network with the applications portal to discover and store a set of automatically-discovered actions of a business process for automation thereof in the database, wherein the set of automatically-discovered actions of the business process is User Interface (UI) data-handling operations of applications to achieve a task, operating a build-automation-document module, said build-automation-document module comprising:

retrieving the set of previously discovered and prestored automatically-discovered actions of the business process for automation thereof and instances thereof and associated metadata and screenshots, wherein each action is of a related type and related to an application to complete the business process via the applications portal, wherein the business process for automation is comprised of one or more routines;

for each action of the set of the previously discovered and prestored automatically-discovered actions, extracting an associated routine-name of a routine;

grouping actions by a related window in a related application and type of action into clusters of actions;

removing clusters of actions which are not necessary to an automated business process;

sorting the clusters of actions in an order for automatically performing the business process; and saving the sorted automatically-discovered actions instances thereof and the associated metadata and screenshots into a documentation-file to be presented on a display unit that is associated to the computerized system, wherein the documentation-file comprising a title of the business process, a summary of the business process and details of ordered clusters of actions, wherein an instance is a series of two or more tasks of the business process, and wherein the ordered clusters of actions are presented as a flow diagram.

2. The computerized-method of claim 1, wherein the sorting of the clusters of actions is performed according to a minimum timestamp of action in each cluster of actions.

3. The computerized-method of claim 1, wherein each action or cluster of actions in the automated business process is associated with a screenshot.

4. The computerized-method of claim 1, wherein the documentation-file is of a format that is selected from: Word or Hypertext Markup Language (HTIL) or Portable Document Format (PDF) or any other readable file format.

5. The computerized-method of claim 1, wherein each action in the set of automatically discovered actions of a business process for automation is a keyboard-based command or a mouse-click command in one or more applications to complete the business process, via the applications portal.

6. The computerized-method of claim 1, wherein the routine of the extracted associated routine-name is comprised of one or more actions.

7. The computerized-method of claim 1, wherein the routine is a routine for data exchange within one application or between two or more applications, which are operated via the applications portal to complete the business process.

8. The computerized-method of claim 1, wherein the removing clusters of actions is performed according to a preconfigured action type blacklist.

9. The computerized-method of claim 8, wherein the preconfigured action type blacklist includes at least one action of: (i) selecting an object or a text and moving it and then placing it into alternate area: (ii) switching between tabs or windows; (iii) opening a menu of ancillary operations; (iv) any other action.

* * * * *